United States Patent [19]

Ferrier

[11] Patent Number: 4,639,794

[45] Date of Patent: Jan. 27, 1987

[54] MULTIPLY PULSED MAGNETIC RECORDING

[75] Inventor: Herman Ferrier, Los Gatos, Calif.

[73] Assignee: Fuji Photo Film Co., Ltd., Japan

[21] Appl. No.: 622,333

[22] Filed: Jun. 19, 1984

[51] Int. Cl.[4] ............................ G11B 5/09; G11B 5/02
[52] U.S. Cl. ......................................... 360/46; 360/68
[58] Field of Search ..................................... 360/46, 68

[56] References Cited

U.S. PATENT DOCUMENTS 4,455,581  6/1984  Camras ................................... 360/53
4,551,772  11/1985  Sliger ..................................... 360/46
4,562,491  12/1985  Kawabata et al. ..................... 360/46

Primary Examiner—Vincent P. Canney
Attorney, Agent, or Firm—Sughrue, Mion, Zinn, Macpeak and Seas

[57] ABSTRACT

A current driver for magnetic recording comprising a current source, a current steering bridge for directing the current in one of two directions through a magnetic recording head during the length of a data pulse and a head select switch which allows current to flow through the head only for several short pulses occurring during the data pulse such that the magnetic regions impressed by the short pulses form a nearly continuous magnetic region on the recording medium.

14 Claims, 7 Drawing Figures

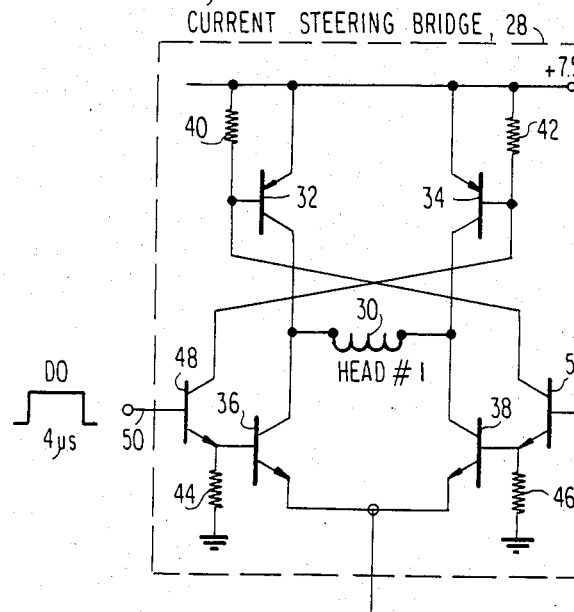
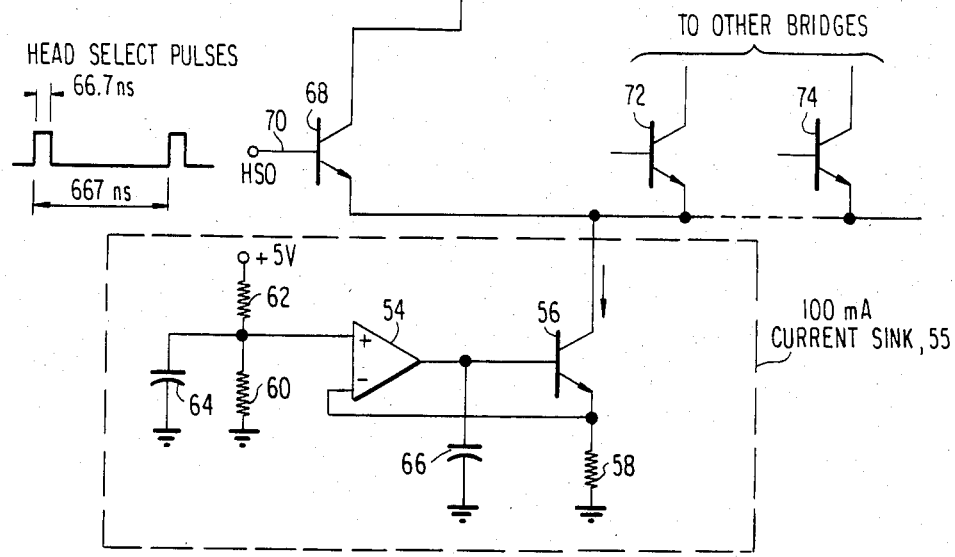
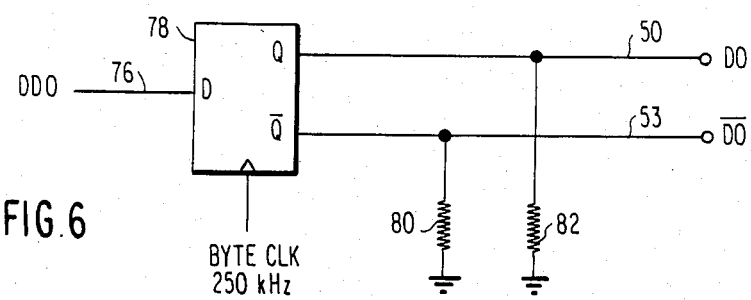
FIG. 5
FIG. 6

MULTIPLY PULSED MAGNETIC RECORDING

BACKGROUND OF THE INVENTION

The invention relates generally to magnetic recording, and, in particular, it relates to wave-shaping of drive currents for magnetic recording.

Magnetic recording on tape and similar media is a well developed and important technology. Of particular interest is digital, or more precisely binary, storage in which the magnetic tape is magnetized in one direction for one state and in another direction for another state. An example of a recorded magnetic tape is shown in the pictorial illustration of FIG. 1 in which the tape is divided into multiple sections, each a bit length long although the location of bit boundaries is arbitrary. A magentic recording head impresses a magnetization in either one direction or another, dependent on the data signal. The signal thus recorded is subsequently read by a read head using techniques well known in the art.

Tape systems have been developed which write multiple parallel channels or tracks on a single tape. These systems not only increase the bit density on tape but afford the simplicity in computer systems of simultaneously writing entire bytes or words without the need for serializing data available in parallel format.

Thin-film magnetic recording heads have been developed which allow the simultaneous fabrication of a multi-element head using fabrication techniques similar to those used in microelectronics. One such thin-film head is described by Raemaekers in a technical article entitled "Recording Experiments with Multi-Track Thin-film Heads', appearing in IEEE Transactions on Magnetism, vol. MAG-18, 1982, pp. 1143–1145.

A problem occurs with thin-film heads in that they are so lightweight that the head cannot adequately dissipate heat if all the elements in the head are simultaneously and continuously driven. This overheating problem could be solved by increasing the mass of the thin-film head. However, one advantage of thin-film heads is their small size and light weight, and that advantage would be negated by this solution. Alternatively, auxiliary cooling could be attached to the heads. This solution however also increases the head weight and further complicates its otherwise simple structure.

SUMMARY OF THE INVENTION

Accordingly, it is an object of this invention to provide a method for magnetic recording which minimizes head heating.

Yet a further object is to provide a method for magnetic recording which reduces head heating without altering the conventional head design.

The invention can be summarized as a method for current driving a digital magnetic recording head in which a binary current drive pulse is divided into a plurality of narrower current pulses such that the magnetization of the film moving beneath the recording head is nearly continuous.

BRIEF DESCRIPTION OF THE DRAWINGS

FIG. 5 is a schematic illustration of an embodiment of the current driver of the present invention;

FIG. 6 is a schematic illustration of a data source circuit; and

DETAILED DESCRIPTION OF THE PREFERRED EMBODIMENTS

Figure 1:
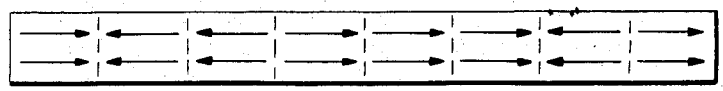
FIG. 1 is a plan view schematically illustrating magnetic recording regions on a magnetic tape.
Figure 2:
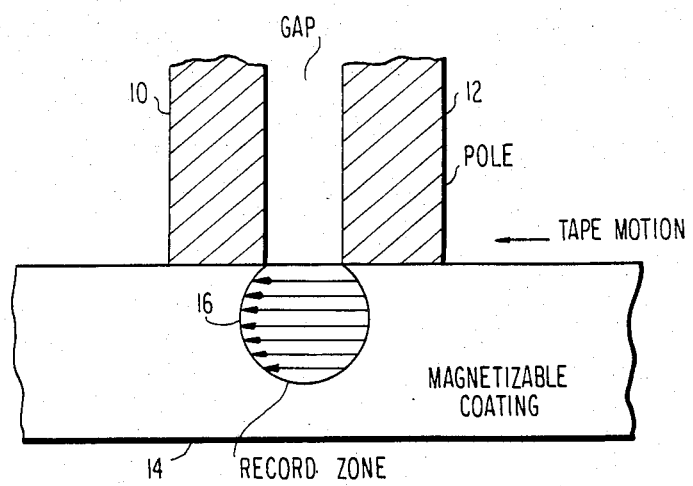
FIG. 2 is a cross-sectional view of a magnetic region impressed in a magnetic recording material.
Figure 3:
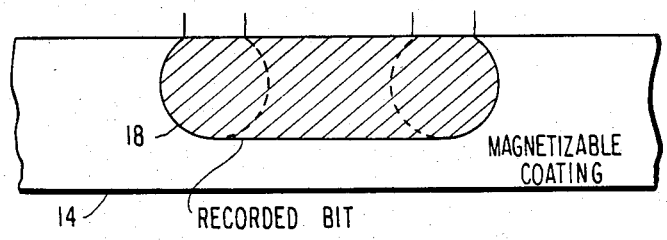
FIG. 3 is a cross-sectional view of a recorded bit in a magnetic material as practiced in the prior art.

The model of magnetization on a magnetic recording medium illustrated schematically in FIG. 1 is too simplified for an understanding of the present invention. A more complete model is shown in the cross-sectional view of FIG. 2. The recording head comprises two magnetic poles 10 and 12 separated by a gap. A recording medium, such as a tape is covered with a magnetizable coating 14 that is fed past the poles 10 and 12 at a predetermined rate and is spaced as close to the poles 10 and 12 as is practical. The poles 10 and 12 can impress magnetization onto the coating 14 in one of two polarities, depending upon the direction of current being delivered to the recording head between the poles 10 and 12. At a particular time, so that the tape and its coating 14 can be considered to be stationary, the poles 10 and 12 will impress a bubble-shaped region 16 of saturation magnetization upon the coating. The bubble 16 lies roughly below the gap between the poles 10 and 12 and extends somewhat beneath the poles. In prior art recording systems, the recording head is driven for the entire time of a recorded bit as the tape moves beneath the poles so that the bubbles are merged into a continuous region 18 of magnetization as is illustrated in the cross-sectional view of FIG. 3. However, as was previously noted, this type of recording results in overheating, particularly for thin-film heads.

According to this invention, the recording head is repetitivley pulsed during the recording of a single bit so that while the magnetized region is not uniform, it is nonetheless nearly continuous. As illustrated in the cross-sectional view of FIG. 4, three write pulses are used for each recorded bit. The three write pulses, used only as an example, create three corresonding bubbles 20, 22 and 24, which because of their lateral extent intersect and form a nearly continuous region of magnetization composed of the bubbles 20, 22 and 24. The next bubble 26 to be recorded belongs to the next recorded bit and its polarity may differ from the previous bubble 24, depending upon the data to be recorded. The illustration of FIG. 4 does not plainly show the effect of the finite pulse width of the recording pulses which produce the bubbles 20–24. A realistic ilustration would extend the lateral extent of the bubbles 20–26 due to the continuous movement of the coating 14 relative to the recording head.

As is illustrated in the article by Raemaekers, the magnetization of the two poles 10 and 12 is controlled by current passing on a line between the poles. Thus the entire problem of a magnetization waveform reduces to steering an appropriate current waveform to the recording head. A current driver useful for the practice of this invention is schematically illustrated in FIG. 5. A current steering bridge 28 steers current through a coil 30 of a recording head comprising the poles 10 and 12, shown in FIG. 2, and the coil 30 providing a current path between or around the poles. The voltage and therefore the direction of current across the head 30 are controlled by an upper pair of PNP transistors 32 and 34 and a lower pair of NPN transistors 36 and 38. The PNP transistors 32 and 34 may be 2N2907 transistors and the NPN transistors 36 and 38 may be 2N2222 transistors. The emitters of the PNP transistors 32 and 34 are connected to an 8 V power supply and their bases are separately connected to this same voltage through 1 kΩ resistors 40 and 42. The collector of one PNP transistor 32 is directly connected to the collector of the NPN transistor 36. Similarly, the collectors of the other two transistors 34 and 38 are tied together. The coil 30 is connected across the pair of joined collectors. The bases of the NPN transistors 36 and 38 are separated from ground by respective 1 kΩ resistors 44 and 46. The base of the NPN transistor 36 is also connected to the emitter of an NPN transistor 48 that has its collector cross-connected to the base of the opposing PNP transistor 34. This transistor 48 serves as an input transistor for the data signal DO on the non-inverted data line 50 connected to its base. Similarly, an NPN transistor 52 has its emitter connected to the base of the NPN transistor 38 and its collector connected to the base of the PNP transistor 32. The base of this transistor 52 is connected to an inverted data line 54 containing the complemented signal $\overline{DO}$. Additional 1 kΩ resistors may be connected from the bases of the NPN transistors 48 and 52 to ground. The NPN transistors 48 and 52 may be 2N3904 transistors. Both DO and $\overline{DO}$ are simultaneously present on their respective data lines 50 and 53. The value of the respective signal DO or $\overline{DO}$ depends upon the value of the signal.

The emitters of the NPN transistors 36 and 38 are connected together and to a current sink or source 55 that draws a given amount of current from the current steering bridge 28 while presenting close to ground potential to the bridge. The operation of the bridge 28 is to determine in which direction through the coil 30 this current is steered. A high value of DO on the non-inverted data line 50 causes the transistors 48, 36 and 34 to turn on, while the complemented or low value $\overline{DO}$ on the complemented data line 53 causes the transistors 52, 38 and 32 to turn off. As a result the current in this case will flow from right to letf through the coil 30. A low value of DO will reverse the direction of current flow through the coil 30 and thus reverse the direction of the recording magnetization impressed by the head.

The current source 55 is of conventional design consisting of an operational amplifier 54 driving the base of an NPN transistor 56, the collector of which is the input to the current sink. The operational amplifier 54 may be an LM324 and the transistor 56 a 2N2222. The emitter of this transistor 56 is connected to the inverting input of the operational amplifier 54 and is also connected to ground through a 2Ω resistor 58. A reference potential is presented to the non-inverting input of the operational amplifier 54 by connecting it to a point separated from ground by a 39.2 Ω resistor 60 and from +5V by a 1 kΩ resistor 62. Two 0.1 μF capacitors 64 and 66, connected respecitvely to the non-inverting input and the output of the operational amplifier 54 provide noise filtering.

According to the invention, an NPN head select transistor 68 of the type 2N2222 has its collector connected to the emitters of the transistors 36 and 38 of the current steering bridge 28 and has its emitter connected to the input of the current source 55. The base of this resistor 68 has its base connected to a head select line 70, also designated as HSO. When the signal on the head select line 70 is high, the head select transistor 68 is turned on and current flows through the coil 30 in a direction determined by the value DO on the data input line 50. However, when the signal on the data select line 70 is low, the current path through the bridge is interrupted and no current flows through the coil 30, regardless of the value of DO.

The signal on the head select line 70 consists of a series of narrow pulses such that several of them occur during the length of a single data pulse DO. For instance, if the data pulse DO is 4 μs wide, the head select pulses are chosen to be 66.7 ns wide and to repeat every 667 ns so that six head select pulses occur for every data pulse. The duty cycle of the head and its coil 30 in this case is only 10%.

The 4 μs data pulse implies a recording rate of 250 kbits/s. The data pulse may, of course, be longer but a minimum data pulse width is determined by two conditions. First, the minimum physical bit density is 10 to 20 kbits/inch for normal tape (4 to 8 kbits/cm) with the tape speed relating the pulse width and the tape speed. Secondly, recording heads and drive circuits have a minimum response time due to electrical time constants which imposes a lower limit on the data pulse width. It is to be noted that the present invention requires multiple write pulses for each data pulse. As a result, the method of recording of this invention has a lower maximum recording rate imposed by the response time than the maximum rate of continuous recording.

This invention can be advantageously used for thin-film recording heads in which there are multiple heads in a single assembly. In this case, the current steering bridge 28 is duplicated for each coil 30 of the multi-element assembly. Of course, separate data D1, D2, D3, etc. and their complements are connected to the data input lines 50 and 53 of the respective bridges. Each bridge has its own head select transistor 72 and 74. The head select pulses are supplied to the bases of these additional head select transistors 72 and 74 which are out of phase with the head select pulses to the first head select transistors 68, as well as with each other, so that only one head select transistor is on at any given time. Therefore, a single current sink 55 can draw 100 mA of current through each coil 30 at its respective time. That is, the capacity of the current sink 55 can be reduced since its current is being rippled through the various heads at separate times.

Figure 4:
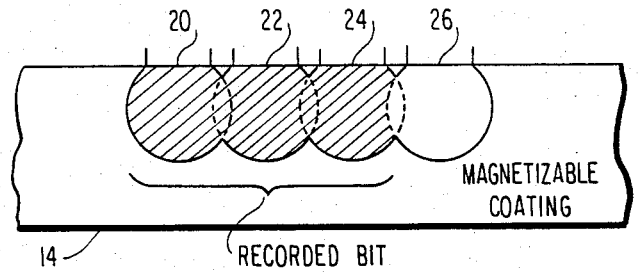
FIG. 4 is a cross-sectional view of a recorded bit in a magnetic material as practiced according to this invention.

A current driver of conventional design drives its coil continuously, with the polarity of the drive current determined by the data. That is, the duty cycle is 100%. However, according to this invention, since each coil 30 is only drawing current a fraction of the time, 10% in the example, less heat is generated in its head and overheating is thereby avoided in thin-film heads. Nonetheless, as illustrated in FIG. 4, the magnetized region representing the recorded bit is nearly uniform. Of course, the pulse width and the pulse repetition rate of the head select pulses must be chosen in view of the tape speed and the pole gap to guarantee that the recorded bubbles are close enough that a tape reading head will not detect unmagnetized portions between the bubbles. It is believed that the impressed magnetic bubble extends laterally for a distance of several gap widths. If this lateral extent is twice the gap width g, then the pulse repetition period $T_R$, which is 667 ns in the example, should be chosen such that $v \cdot T_R$ is nearly equal to or less than 2 g where v is the speed of the tape. If this condition is satisfied, the magnetic bubbles will form a nearly continuous magnetic region.

A typical data source in controlling the transistors 48 and 52 is schematically illustrated in FIG. 6. The digital data DD0 appearing on an input line 76 is fed to the D input of a flip-flop 78 such as a 74LS74. The flip-flop 74 is clocked by a byte clock operating at 250 kHz. The non-inverting data line 50 and the inverting data line 53 are connected to the non-inverting and inverting outputs respectively of the flip-flop 78. Load resistors 80 and 82 having values at 1 kΩ are connected between the data lines 50 and 53 and ground. This data source thus provides clocked and complementary data signals to control the current steering bridge 28.

Figure 7:
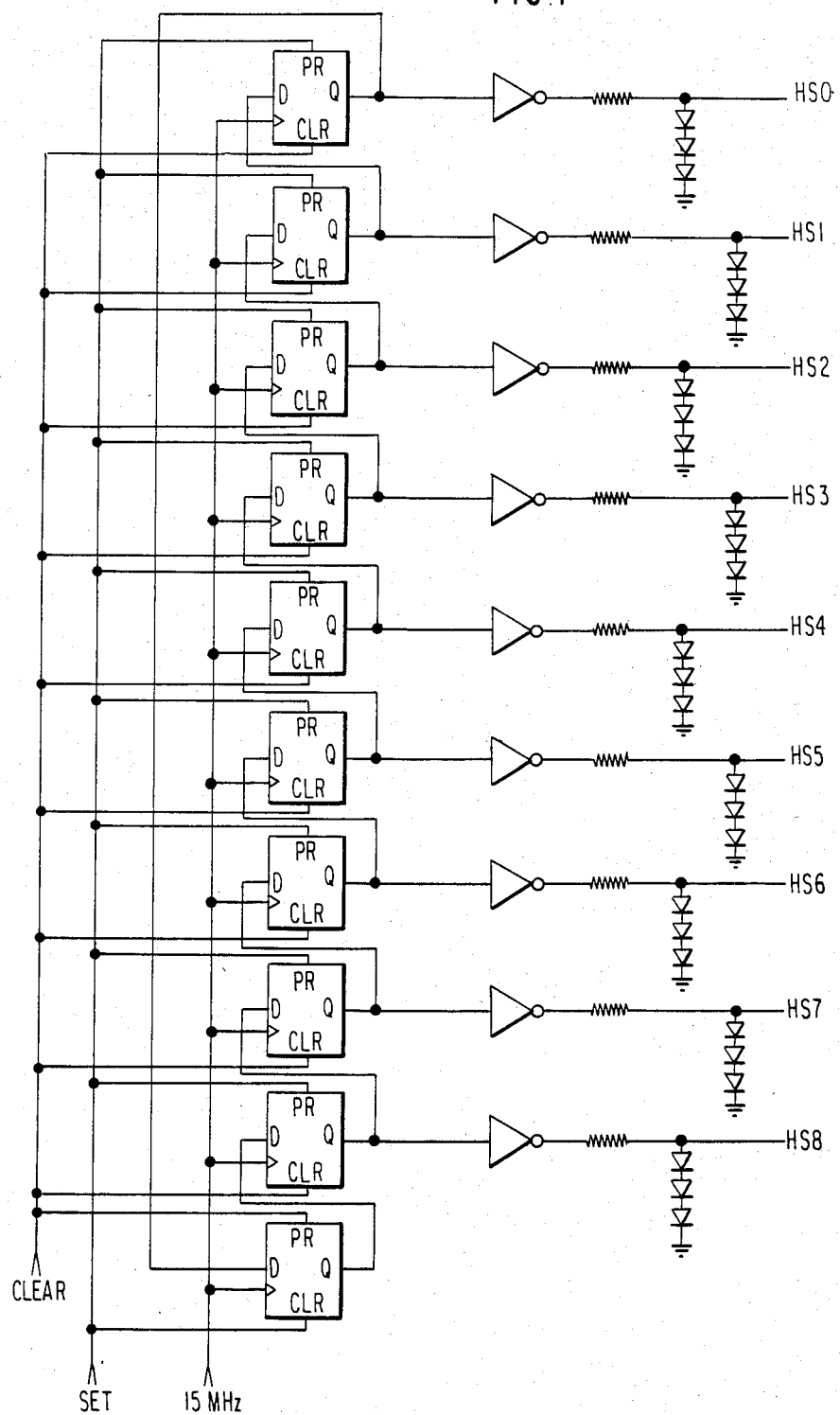
FIG. 7 is a schematic illustration of a ripple circuit for providing head select pulses.

A ripple circuit for controlling the head select transistors 68, 72 and 74 is schematically illustrated in FIG. 7 for the case of nine separate heads and coils 30. The heads are incorporated into an integrated nine-track, thin-film head arranged transversely across to the tape to provide nine parallel and independent recording tracks. Ten flip-flops such as those having designation 74S74 are cascaded in a ladder structure. The non-inverting output of one flip-flop drives the input of the next flip-flop in the ladder. Similarly, the last flip-flop drives the first. All flip-flops are clocked by the same 15 MHz signal. Clear and set controls for the flip-flops are additionally provided. Of course, the ripple circuit could be implemented by integrated circuits of greater complexity. The outputs of nine of the ten flip-flops are connected to the head select lines HS0-HS8 through inverters, such as 74SO4 inverters, and 100 Ω resistors. Each of the lines are separated from ground by cascaded diodes such as a 1N914. These lines HS0-HS8 are then respectively conneced to the bases of the head select transistors 68, 72 and 74. It is seen that only one of the lines HS0-HS8 is high at any one time so that current is being driven through only one of the current steering bridges 28 at any one time. It can be seen from inspecting the circuit that 66.7 ns pulses repeating every 667 ns are rippled onto the head select lines HS0-HS8.

It is important that the current source 55 always provides nearly the same current. However, in the ripple circuit of FIG. 7, 10% of the time no select transistor is enabled so that the current source 55 is connected at that time only to high impedance lines and would take a long time to recover from this condition. Therefore, the bottom-most flip-flop of the ripple circuit controls a dummy head select transistor connecting a dummy current steering bridge (actualy a 51 Ω resistor) to the current source 55. This circuitry is not shown. Thus, the ripple counter at every count is opening a head select transistor to the current source 55.

By means of the described invention, overheating in a thin-film head array is avoided, while the recorded pattern on the tape is almost the same as if the heads had been continuously driven. Tapes recorded by the use of this invention have been found to be indistinguishable by the tape reader in the case where the tape speed was 20 inches/sec (50.8 cm/sec), and the gap between the poles 10 and 12 was 40 microinches (1 μm). A further benefit of the invention is that the power supply average current is also reduced.

I claim:

1. A current driver for a magnetic recording head, comprising:
    means for directing to said head a current of a polarity corresponding to a digital data signal pulse during the pulse width of said signal pulse; and
    means for enabling said current directing means only during a plurality of separate write pulse widths occurring during a signal pulse width, the sum of said plurality of write pulse widths being substantially less than the signal pulse width, a repetition period of said write pulse widths being longer than a value that is a ratio of a value of a head gap of said recording head to a velocity of a magnetic tape moving relative to said magnetic recording head, said value being increased to account for movement of said tape during one said write pulse width.

2. A current driver as recited in claim 1, further comprising a constant current source for providing a current of one polarity to said current directing means and wherein said directing means receives as a current only said current of said one polarity.

3. A current driver as recited in claim 2, wherein said enabling means is a switch for interrupting the supply of said current from said current source to said current directing means and further comprising means for supplying a write signal of regular and repetitive pulses having said write pulse widths to control said switch.

4. A current driver as recited in claim 3, wherein said switch is a transistor.

5. A current driver as recited in claim 3, wherein said current directing means is a current steering bridge.

6. A current driver as recited in claim 5, wherein said switch is a transistor.

7. A current driver as recited in claim 1, wherein said directing means directs current to a plurality of heads and said enabling means enables said directing of current to only one head at a time.

8. A current driver as recited in claim 1, wherein said repetition period is substantially twice a ratio of said head gap to said velocity.

9. A current driver for a plurality of recording heads, comprising:
    a constant current source providing a current of a predetermined polarity;
    a plurality of current steering bridges, each for directing the current from said current source to a corresponding recording head with a polarity determined by a corresponding digital data signal pulse having a data pulse width;
    a plurality of electronic switches connecting said current steering bridges to said current source; and
    means for enabling each of said switches for a plurality of separate write pulse widths during a data pulse width, said switches being enabled successively for one write pulse and only one switch being enabled at a time; and
    wherein a repetition period of said write pulse widths is longer than a value that is a ratio of a value of a head gap of said recording heads to a velocity of a magnetic tape moving relative to said recording heads, said value being increased to account for movement of said tape during one said write pulse width.

10. A current driver as recited in Claim 9, wherein said enabling means enables each said switch during said data pulse width for a duty cycle substantially less than unity.

11. A current driver and recording head, as recited in claim 10, further comprising a thin-film recording head assembly comprising a plurality of conducting paths electrically connected to said recording heads and wherein said current steering bridges direct current through said conducting paths.

12. A current driver as recited in claim 9, wherein said repetition period is substantially twice a ratio of said head gap to said velocity.

13. A method of magnetic recording, comprising the steps of:

supplying digital data in the form of pulses having a data pulse width;

driving a magnetic recording head with a signal for recording said digital data on a magnetic recording medium, said signal comprising a plurality of separate write pulses of the same polarity for each digital datum, said plurality of write pulses occurring during one data pulse width; and determining the one polarity of said write pulses corresponding to said digital datum from the value of said datum;

wherein a repetition period of said write pulses is longer than a value that is a ratio of a value of a head gap of said recording head to a velocity of a tape magnetic moving relative to said magnetic recording head, said value being increased to account for movement of said tape during one said write pulse width.

14. A method of magnetic recording as recited in claim 13, wherein said repetition period is substantially twice a ratio of said head gap to said velocity.

* * * * *